United States Patent [19]

Uibel et al.

[11] 4,286,885

[45] Sep. 1, 1981

[54] FILLER CAP FOR A MIXER

[75] Inventors: Paul-Ulrich Uibel, Ennepetal; Manfred Dörr, Bochum, both of Fed. Rep. of Germany

[73] Assignee: Vorwerk & Co. Interholding GmbH, Wuppertal, Fed. Rep. of Germany

[21] Appl. No.: 112,409

[22] Filed: Dec. 31, 1979

[30] Foreign Application Priority Data

Jan. 11, 1979 [DE] Fed. Rep. of Germany ... 7900590[U]

[51] Int. Cl.³ .............................................. B01F 15/00
[52] U.S. Cl. .................................. 366/347; 241/282.2; 366/150; 366/314
[58] Field of Search ..................... 366/150, 314, 347; 220/373, 374; 126/386; 241/199.2, 282.1, 282.2

[56] References Cited

U.S. PATENT DOCUMENTS

| 2,733,052 | 1/1956 | Luther | 366/205 |
| 2,913,230 | 11/1959 | Hutchins | 241/282.2 |
| 2,930,596 | 3/1960 | Waters | 366/314 |
| 4,087,053 | 5/1978 | Voglesonger | 241/282.1 |

Primary Examiner—Robert W. Jenkins
Assistant Examiner—Timothy F. Simone
Attorney, Agent, or Firm—Michael J. Striker

[57] ABSTRACT

A filler cap for the container of a household mixer with a locking arrangement including a filler tube with a filling opening to receive the products to be mixed, which is arranged concentrically to the axis of rotation of the mixer and a sealing ring. The filler tube is provided with ribs tangently positioned to the filling opening and extending from the filling opening to the sealing ring which is positioned at a lower side of the filler tube. In operation the ribs produce an effect tending to hold the filler cap in its position on the container.

7 Claims, 6 Drawing Figures

FILLER CAP FOR A MIXER

BACKGROUND OF THE INVENTION

The invention relates to household appliances. More particularly the present invention concerns blenders utilized for mixing various products and filler caps provided with a locking arrangement to close the blender jar.

The conventional filler cap is generally provided with a central filling opening located concentrically with the filler cap and a U-shaped sealing ring which establishes a seal wth the blender container. The central filling opening forms a filler funnel for a material to be mixed.

During the processing of material to be mixed the material tends to splash out. This can be particularly observed with liquid media such as, for example, soup and can result in the material flowing over the upper rim of the container.

The filler caps known in the art are normally screwed into the mixer container and locked by a latch of the bayonet-type. However a heating blender disclosed in British Pat. No. 1037 180 has a filler cap which is just pressed into the mixer container.

The disadvantage of filler cap which are screwed into the container is that expecially in heatable mixers it is it is difficult to manipulate the cover since the container becomes very hot. Also, since the container and the cover are of different materials, the different coefficients of thermal expansion tend to result in a wedging of the cover in the container opening.

In the second case, as depicted in FIG. 4 of the British Pat. No. 1037180, a rotating ring of liquid produced by entrainment of the container contents by the rotating wiring blades, tends to push against the cover from below and to dislodge it from the container since there is no latch.

SUMMARY OF THE INVENTION

It is an object of the present invention to improve a filler cap for a blender by providing a reliable locking of the cap which is completely sealed.

Another object of the present invention is to provide a filler cap for a blender which can be easily manipulated during the mixing process.

These and other objects are achieved by tangentially running ribs positioned on the lower side of the cap between the rim of the filler opening and a U-shaped sealing ring.

The ribs may be provided by thickening portions connected to the inner side of the filler opening and extended tangent to the direction of rotation of a liquid medium to be processed, internal sides formed between the filler opening rim and the ribs form dripping edges for the liquid medium.

The ribs may be curved in the direction of rotation of the liquid media in accordance with another embodiment of the present invention.

The ribs may be inclined in the vertical direction from the filler opening to the U-shaped sealing ring.

With the structural particulars provided in the present device it has been found advantageous that the effect of the vertical force of the rotating ring of liquid which is produced by the mixing blades is sufficiently reduced in its action on the filler cap, so that the locking arrangement may hold the filler cap on the mixer container with a smaller force. It also has been found advantageous that the filler cap in accordance with the present invention may be completely sealed by placing it on the container rim without additional fastening means being needed, such as threads, and that the cap may later, after the cooling operation in the mixer is completed, be removed again with similar simplicity.

DESCRIPTION OF THE PREFERRED EMBODIMENTS

Figure 1:
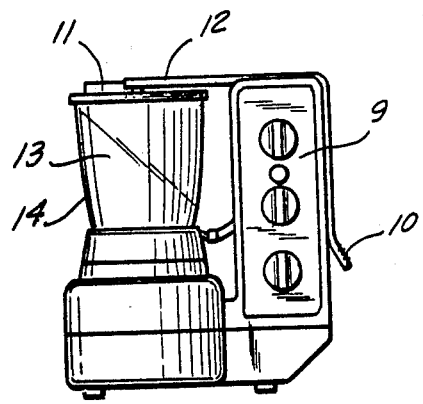
FIG. 1 is a schematic view of a mixer having a filler cap with a locking arrangement in accordance with the present invention.
Figure 2:
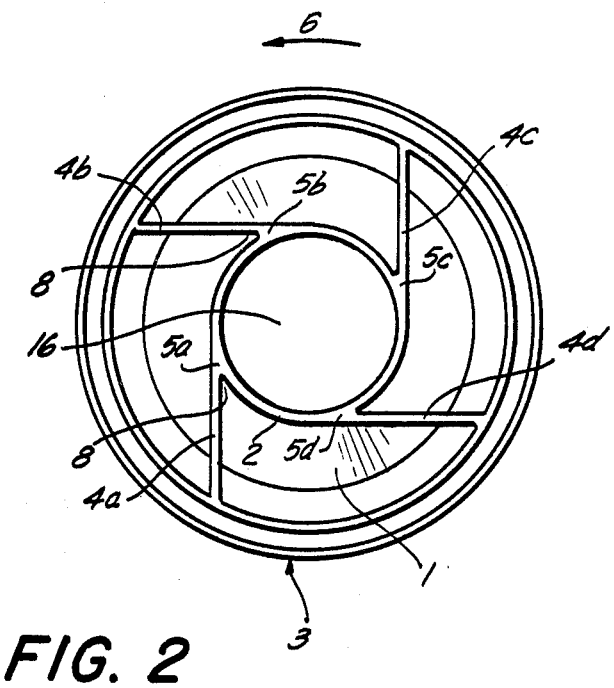
FIG. 2 is a bottom view of the filler cap.

Referring now to FIG. 1, a household mixer 9 is depicted with a locking arrangement designated at 10. A filler cap 11 with a funnel tube to receive the products to be mixed is pressed with a given force into a mixer container 13 and there supported by a fork-like arm 12. In operation, the mixing blade (not shown) normally positioned within the container having the walls 14, agitates the liquid in the container and forms a rotating liquid ring (also not shown). This liquid ring exerts upon a lower side of the filler cap 11 (FIG. 2) a force acting in a vertical direction in dependence upon the shape of the blade and the rotation energy produced by the blade. This energy is sufficiently large, if the number of revolutions per minute accounts to e.g. 9000 RPM, to overcome the force exerted by the arm 12 and to cause the liquid to splash out of the container. In order to avoid the above-described action the lower side 1 of the filler cap is provided with ribs 4a–4d shown in FIG. 2. The ribs 4a–4d extend tangent from the central filler opening 16 to the sealing ring 3 which is of U-shaped cross section.

Figure 3:
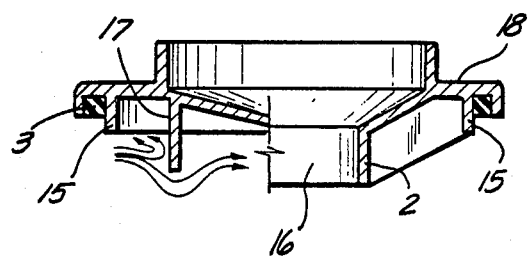
FIG. 3 is a section elevational view of the filler cap shown in FIG. 2.

Referring to FIG. 3, the ribs are formed with webs 15 extending inwardly from a wall 18 to the filling opening 16. The purpose of these ribs is to effect a marked reduction in the vertical force of the rotating liquid ring.

Figure 4:
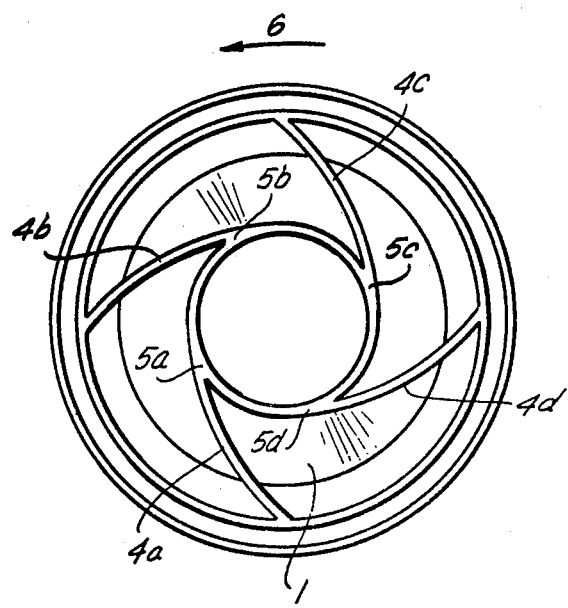
FIG. 4 is a bottom view of a filler cap in accordance with another embodiment of the present invention.

As is shown by the arrow 6 in FIG. 4, the liquid ring rotates in counterclockwise direction dependent upon the direction of rotation of the mixer blades, so that the flowing liquid forming the ring will be continuously broken up by the tangently positioned ribs 4a–4d. This will necessarily result in breaking the flow at the tangently positioned outer sides 17 of the ribs 4a–4d (the curved arrows in FIG. 3 show the direction of flow of the broken-up liquid whereby the liquid ring will be lifted from the underside 1 of the cover 11, be subjected to eddy formation behind each of the respective ribs 4a–4d, and can re-establish contact with the underside 1 only for very short period before encountering the next ribs where the process will be repeated.

Due to this measure the vertical force is almost entirely negated the same, so that the force applied by the arm 12 on the filler cap 11 provides a continuous and entirely sealed locking engagement of the same with the rim of the mixer container.

The rotary liquid ring causes constant rotation impulses to act on the filler cap 11. These impulses must have horizontal components acting along the ribs 4a–4d. For this purpose it is necessary to assure that the angle of attack of the liquid ring be directed to the tangently positioned outer sides 17 of the ribs 4a–4d.

Figure 6:
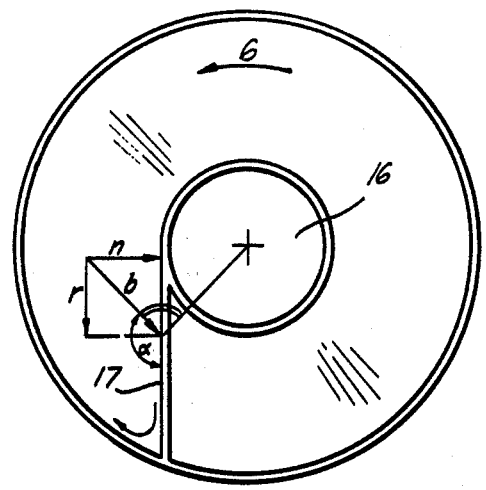
FIG. 6 is a schematic view showing the forces applied to the outer side of the rib.
Figure 5:
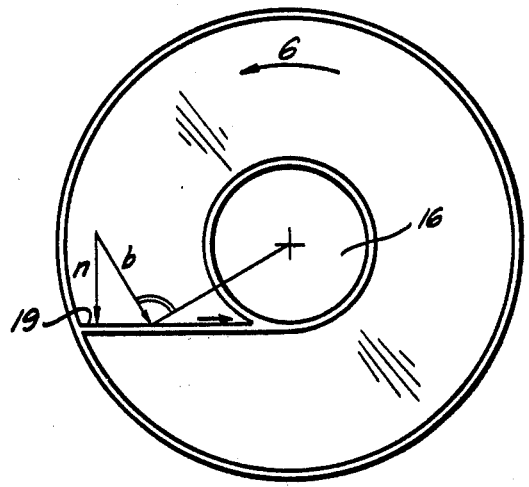
FIG. 5 is a schematic view of forces exerted in the liquid contained in the mixer and applied to an internal side of a rib on the cap.

The disposition of the forces acting on the ribs is shown in FIGS. 6 and 7 and will be explained in detail below. The vector b shows the angle of attack of the liquid which may include two components denoted as n and r. In FIG. 5, the liquid acts on the tangent inner sides 19 in a turbulent manner and is directed towards the central filler opening 16 where it returns with the rotating liquid ring. With this arrangement the desired formation of turbulence is not attainable and, accordingly, the liquid flows in a laminar manner again and the vertical force again acts on the lower side of the filler cap.

If, however, the ring of rotating liquid is made to impinge upon the tangentially outer side of the ribs, as shown in FIG. 6, then the liquid is deflected to the inner web 15 of the ring 3 and then the desired turbulence is obtained. This holds the liquid ring away from the underside of the cap 1 and therefore strongly reduces to vertical force acting on the cap. The reason for this behavior of the liquid results from the increasing inclination of the ribs 4a–4d in direction towards inner webs 15, as can be seen in FIG. 3.

To further improve the effect of the structure of the present invention, the ribs 4a–4d may be curved in the direction of rotation of the liquid as shown in FIG. 4. By this arrangement the angle of impact is increased and a faster turbulent process may be achieved.

It will be understood that each of the elements described above, or two or more together, may also find a useful application in other types of constructions differing from the types described above.

While the invention has been illustrated and described as embodied in a filler cap for a household blender, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filler cap for a household mixer of the type having rotary blades for mixing the media contained in the filler cap and a locking arrangement, comprising a filler tube to provide a funnel inlet for the media to be mixed, said filler tube having a filling opening positioned concentrically to the axis of rotation of the mixer; and a sealing ring connected to said filler tube, said filler tube including a plurality of ribs formed at the underside thereof and extending between a border of said filling opening and said sealing ring, said ribs being projected tangent to said filling opening so that vertically acting forces exerted by a ring of rotating liquid tending to be thrown upwardly due to rotation of said blades, are substantially negated due to interception and breaking up of the ring of rotating liquid by said ribs.

2. The filler cap of claim 1, wherein said ribs are provided with webs extending from said underside of the filler tube toward said filling opening in the vertical direction.

3. The filler cap of claim 1, wherein said ribs are provided with thickened portions connected to said border of the filling opening to form tangent position points in the direction of rotation of liquid media to be mixed.

4. The filler cap of claim 1, wherein said border of the filling opening forms a dripping edge for the liquid medium to be mixed.

5. The filler cap of claim 1, wherein said ribs are curved in the direction of rotation of media to be mixed.

6. The filler cap of claim 1, wherein said ribs are inclined in the vertical direction between said filling opening and said sealing ring.

7. The filler cap of claim 1, wherein said sealing ring is of U-shaped cross-section.

* * * * *